(12) United States Patent
Huang et al.

(10) Patent No.: US 11,155,973 B1
(45) Date of Patent: Oct. 26, 2021

(54) TRIANGULAR MODULAR ECOLOGICAL SEAWALL

(71) Applicant: GUANGDONG RESEARCH INSTITUTE OF WATER RESOURCES AND HYDROPOWER, Guangdong (CN)

(72) Inventors: Bensheng Huang, Guangzhou (CN); Da Liu, Guangzhou (CN); Chao Tan, Guangzhou (CN); Jing Qiu, Guangzhou (CN); Huijian Kuang, Guangzhou (CN); Liwen Wang, Guangzhou (CN); Hongxiang Ji, Guangzhou (CN); Lei Guo, Guangzhou (CN); Xiaoli Feng, Guangzhou (CN)

(73) Assignee: Guangdong Research Institute of Water Resources and Hydropower, Guangdong (CN)

( * ) Notice: Subject to any disclaimer, the term of this patent is extended or adjusted under 35 U.S.C. 154(b) by 246 days.

(21) Appl. No.: 16/611,298

(22) PCT Filed: Dec. 28, 2018

(86) PCT No.: PCT/CN2018/124573
§ 371 (c)(1),
(2) Date: Nov. 6, 2019

(87) PCT Pub. No.: WO2020/098105
PCT Pub. Date: May 22, 2020

(30) Foreign Application Priority Data

Nov. 14, 2018 (CN) .......................... 201811357987.7

(51) Int. Cl.
*E02B 3/10* (2006.01)
*E02B 3/14* (2006.01)
(Continued)

(52) U.S. Cl.
CPC .................. *E02B 3/10* (2013.01); *E02B 3/12* (2013.01); *E02B 8/06* (2013.01)

(58) Field of Classification Search
CPC ..... E02B 3/04; E02B 3/06; E02B 3/12; E02B 3/14; E02B 8/06
See application file for complete search history.

(56) References Cited

U.S. PATENT DOCUMENTS

| 952,645 | A | * | 3/1910 | Smith | ................. E02D 29/0266 |
| | | | | | 405/285 |
| 2,344,302 | A | * | 3/1944 | Harza | ....................... E02B 3/14 |
| | | | | | 405/16 |

(Continued)

FOREIGN PATENT DOCUMENTS

| CN | 205557440 U | 9/2016 |
| CN | 106087858 A | 11/2016 |

(Continued)

*Primary Examiner* — Benjamin F Fiorello
(74) *Attorney, Agent, or Firm* — Wiggin and Dana LLP; Gregory S. Rosenblatt; Thomas M. Landman

(57) ABSTRACT

Disclosed is a triangular modular ecological seawall, including a plurality of first prefabricated frames arranged in an array, a second prefabricated frame and a wave break forest which are disposed between two adjacent first prefabricated frames and fill gaps between the first prefabricated frames, the first prefabricated frame and the second prefabricated frame are tubular and each have a triangular cross-section shape, and inner cavities of the first prefabricated frame and the second prefabricated frame are respectively filled with first sea sand.

10 Claims, 2 Drawing Sheets

A-A

(51) Int. Cl.
*E02B 8/06* (2006.01)
*E02B 3/12* (2006.01)

(56) References Cited

U.S. PATENT DOCUMENTS

| | | | | |
|---|---|---|---|---|
| 4,080,793 | A * | 3/1978 | Pulsifer | E02B 3/06 |
| | | | | 405/30 |
| 4,362,432 | A * | 12/1982 | Conover | E02B 3/06 |
| | | | | 405/33 |
| 5,176,468 | A * | 1/1993 | Poole | E02B 3/04 |
| | | | | 405/111 |
| 6,334,736 | B1 * | 1/2002 | Johnson | E02B 3/108 |
| | | | | 405/107 |
| 6,454,491 | B1 * | 9/2002 | Wayne | E02B 3/106 |
| | | | | 405/32 |
| 8,662,790 | B2 * | 3/2014 | Phelps | E02B 3/108 |
| | | | | 405/111 |
| 9,228,312 | B2 * | 1/2016 | Smith | E02D 29/055 |
| 9,574,314 | B2 * | 2/2017 | Sapi | E02B 3/108 |
| 10,895,050 | B1 * | 1/2021 | Johnson, Jr. | E02B 3/046 |
| 2008/0075535 | A1 * | 3/2008 | Han | E02B 3/04 |
| | | | | 405/16 |
| 2015/0275450 | A1 | 10/2015 | Butler | |
| 2017/0204577 | A1 * | 7/2017 | Arrington | E02B 3/108 |
| 2017/0241091 | A1 * | 8/2017 | Van Reijen | E02B 3/10 |
| 2019/0242083 | A1 * | 8/2019 | Liu | E02B 7/10 |
| 2020/0123724 | A1 * | 4/2020 | Boonlikitcheva | E02B 3/062 |
| 2021/0172137 | A1 * | 6/2021 | Abeles | E02B 3/04 |
| 2021/0251197 | A1 * | 8/2021 | Gagliano | A01K 61/54 |

FOREIGN PATENT DOCUMENTS

| | | |
|---|---|---|
| CN | 207193904 U | 4/2018 |
| KR | 100642573 B1 | 10/2006 |
| RU | 2200792 C2 | 3/2003 |

\* cited by examiner

A-A

TRIANGULAR MODULAR ECOLOGICAL SEAWALL

FIELD

The disclosure relates to a seawall, and in particular to a triangular modular ecological seawall.

BACKGROUND

The risk of storm surges in coastal areas with long coastlines is more serious than in other areas, and the protection task is arduous and the areas are vulnerable to typhoons. The seawall project is the most important water conservancy facility for resisting typhoon storm tide. Frequent typhoon storm tides pose a serious threat to the seawall and even cause devastating damage.

As the construction standards of seawalls are getting higher, existing coastal embankment projects will face the problem of insufficient protection standards. Some ecological seawall designs have been proposed in the process of reaching the standard for seawall reinforcement in the prior art, but in fact only the slope protection with vegetation has been done, and the effect thereof is far from the effect of actual measures of dissipating waves by using plants. In some designs, wave break forests are planted in front of earth embankments or seawalls with concrete protecting surfaces, but the seawall is not stable enough and the speed of embankment is slow. The technical defects of the prior art are: poor storm surge resistance, high difficulty and slow speed in construction and repair.

SUMMARY

The technical problem to be solved by the disclosure is to provide a triangular modular ecological seawall, which can realize rapid construction, strong structural stability, good wave-dissipating effect of plants and a landscape function.

The technical solution adopted to solve the foregoing technical problems is as follows.

A triangular modular ecological seawall is provided, including:

a plurality of first prefabricated frames arranged in an array, a second prefabricated frame and a wave break forest which are disposed between two adjacent first prefabricated frames and fill gaps between the first prefabricated frames, wherein the first prefabricated frame and the second prefabricated frame are tubular and each have a triangular cross-section shape, and inner cavities of the first prefabricated frame and the second prefabricated frame are respectively filled with first sea sand;

the second prefabricated frame is smaller than the first prefabricated frame, one edge of each of the first prefabricated frames is collinearly disposed, and two edges of each of the second prefabricated frames are attached to two adjacent first prefabricated frames respectively.

As an improvement, the cross-sectional shape of each of the first prefabricated frame and the second prefabricated frame is an equilateral triangle.

As an improvement, the first prefabricated frame and the second prefabricated frame are each provided with a soil layer covering the first sea sand, and the soil layer is provided with first vegetation.

As an improvement, the seawall further includes a slope formed by filling second sea sand at one side of the first prefabricated frame, the slope being higher at one side adjacent to the first prefabricated frame than the other side, and having a top surface provided with a hard pavement and a slope surface covered with second vegetation.

As an improvement, the wave break forest is *mangrove* or *Casuarina*, the hard pavement is a clay-bound macadam pavement, the first vegetation is saline-alkaline tolerant shrubs, and the second vegetation is turf.

As an improvement, the seawall further includes:

a plurality of electrical pumping stations arranged on the first prefabricated frame, a first drainage ditch passing through the slope, a second drainage ditch arranged in an array direction of the first prefabricated frame at a lowest position of the slope, one end of the first drainage ditch being connected to the electrical pumping station, and the other end of the first drainage ditch being connected to the second drainage ditch.

As an improvement, the slope has a slope ratio of 1:3, the hard pavement has a width of 6 m, the cross-sectional shape of the first prefabricated frame is an equilateral triangle with an edge length of 12 m.

As an improvement, the soil layer has a thickness of 0.5 m.

As an improvement, the seawall further includes a landscape plank road between two adjacent first prefabricated frames arranged in a same direction as the array direction of the first prefabricated frame, and the second prefabricated frame and the wave break forest are disposed in a space defined by the landscape plank road and the first prefabricated frame.

As an improvement, the landscape plank road is made of corrosion-resistant wood.

Beneficial effects: the first prefabricated frame and the second prefabricated frame facilitate prefabrication and modular construction and are internally filled with sea sand, and the sea sand can be taken on the coast site, which is favorable for quick filling. The triangular structures of the first prefabricated frame and the second prefabricated frame make the structure of the seawall stable and reliable, and the second prefabricated frame is smaller than the first prefabricated frame, so that the first prefabricated frame forms a convex tip, which has the effect of eliminating waves and can greatly reduce energy of storm surges.

BRIEF DESCRIPTION OF THE DRAWINGS

The disclosure will be further described below in conjunction with the accompanying drawings.

DETAILED DESCRIPTION OF THE EMBODIMENTS

Figure 1:
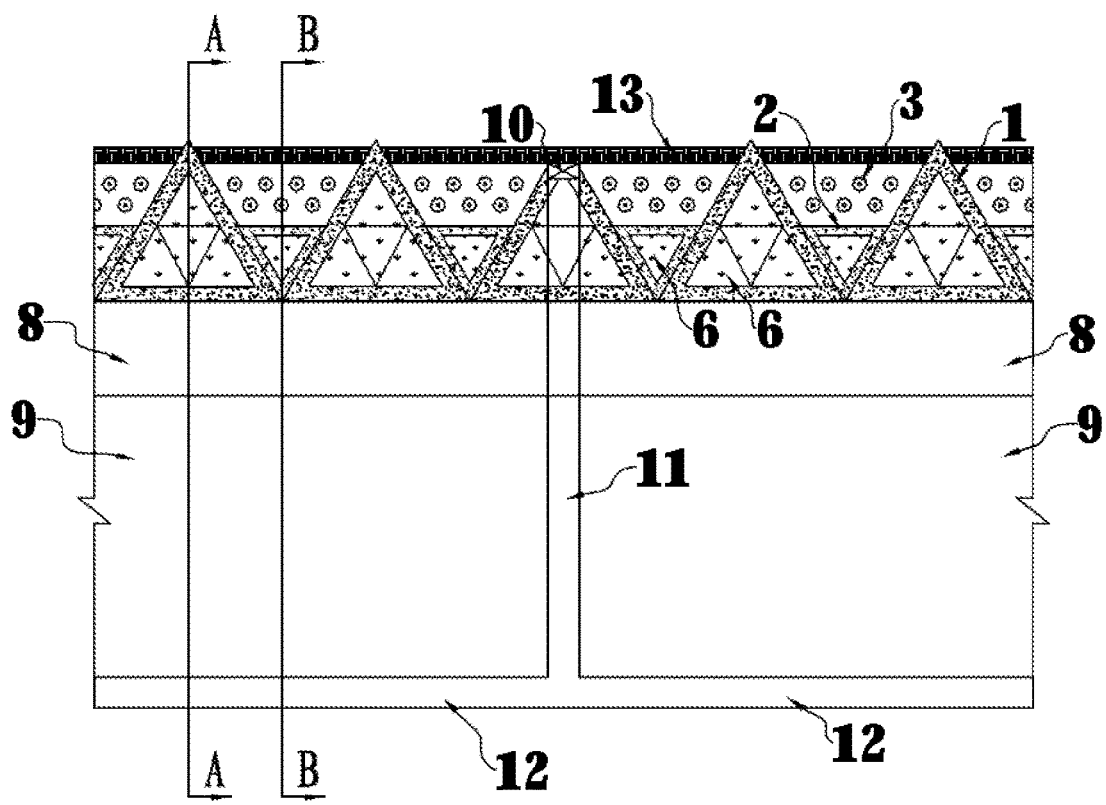
FIG. 1 is a schematic structural diagram of an embodiment of the disclosure.
Figure 2:
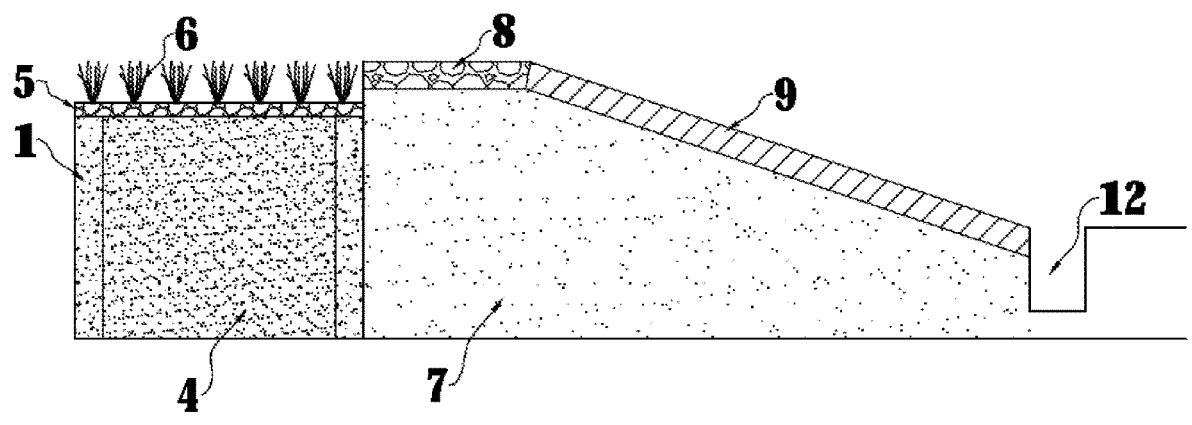
FIG. 2 is a schematic diagram of a cross-section A-A in FIG. 1 according to an embodiment of the disclosure.
Figure 3:
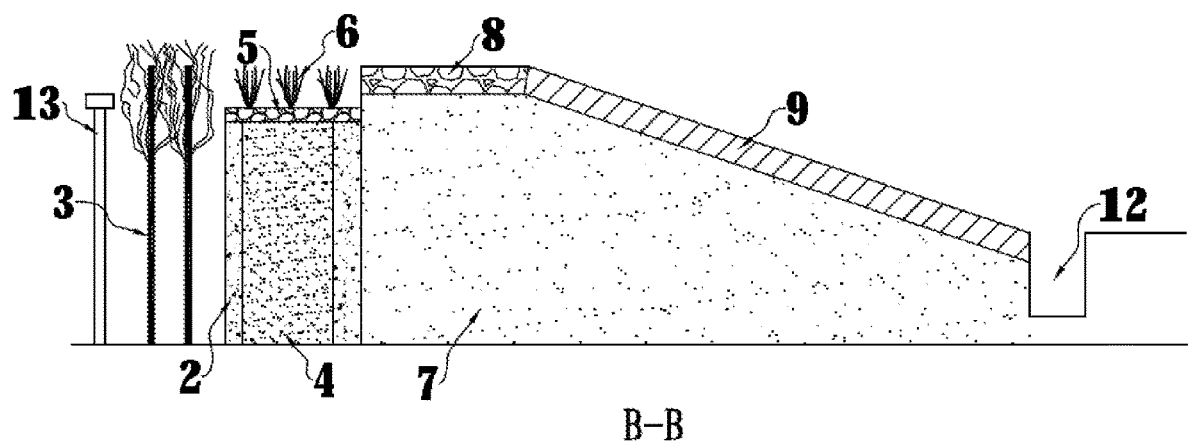
FIG. 3 is a schematic diagram of a cross-section B-B in FIG. 1 according to an embodiment of the disclosure.

Referring to FIGS. 1-3, a triangular modular ecological seawall includes a plurality of first prefabricated frames 1 arranged in an array, a second prefabricated frame 2 and a wave break forest 3 between two adjacent first prefabricated frames 1 which both fill gaps between the first prefabricated frames 1. The first prefabricated frame 1 and the second prefabricated frame 2 are tubular and each have a triangular cross-section shape, and inner cavities of the first prefabricated frame 1 and the second prefabricated frame 2 are respectively filled with first sea sand 4. The first prefabricated frame 1 and the second prefabricated frame 2 according to this embodiment are made of concrete and have the characteristics of corrosion resistance and impact resistance. The first prefabricated frame 1 and the second prefabricated frame 2 facilitate prefabrication and modular construction and are internally filled with sea sand, and the sea sand can be taken on the coast site, which is favorable for quick filling.

The second prefabricated frame 2 is smaller than the first prefabricated frame 1, one edge of each of the first prefabricated frames 1 is collinearly disposed, and two edges of each of the second prefabricated frames 2 are attached to two adjacent first prefabricated frames 1 respectively.

The triangular structures of the first prefabricated frame 1 and the second prefabricated frame 2 make the structure of the seawall stable and reliable, and the second prefabricated frame 2 is smaller than the first prefabricated frame 1, so that the first prefabricated frame 1 forms a convex tip, which has the effect of eliminating waves and can greatly reduce energy of storm surges.

The cross-sectional shape of the first prefabricated frame 1 and the second prefabricated frame 2 may be general triangles, or isosceles triangles or equilateral triangles. In order to facilitate mounting the first prefabricated frame 1 and the second prefabricated frame 2, the cross-sectional shapes of the first prefabricated frame 1 and the second prefabricated frame 2 are equilateral triangles, so that it is convenient to position the first prefabricated frame 1 and the second prefabricated frame 2.

In order to improve the erosion resistance of the slope, the first prefabricated frame 1 and the second prefabricated frame 2 are each provided with a soil layer 5 covering the first sea sand 4, and the soil layer 5 is provided with first vegetation 6. The soil layer 5 in this embodiment has a thickness of 0.5 m.

In order to strengthen the structural strength of the seawall, one side of the first prefabricated frame 1 is filled with second sea sand 7 and forms a slope, one side of the slope adjacent to the first prefabricated frame 1 is higher than the other side, the top surface of the slope is provided with a hard pavement 8, and the slope surface of the slope is covered with second vegetation 9. In order to improve the erosion resistance of the slope, the hard pavement 8 in this embodiment is a clay-bound macadam pavement.

In order to further enhance the wave-dissipating effect and erosion resistance of the seawall, the wave break forest 3 is *mangrove* or *Casuarina*, and the first vegetation 6 is low saline-alkaline tolerant shrubs. Preferably, the first vegetation 6 in this embodiment is *Spartina alterniflora*, and the second vegetation 9 is turf. The wave break forest 3 in this embodiment forms an integrated structure with the first prefabricated frame 1 and the second prefabricated frame 2, which is beneficial to strengthening the structural strength and wave-dissipating effect of the seawall.

The first prefabricated frame 1 in this embodiment is provided with an electrical pumping station 10, the slope is provided with a first drainage ditch 11 passing through the slope, a second drainage ditch 12 disposed in an array direction of the first prefabricated frame 1 is disposed at the lowest position of the slope, one end of the first drainage ditch 11 is connected to the electrical pumping station 10, and the other end of the first drainage ditch 11 is connected to the second drainage ditch 12. The electrical pumping station 10 is a water conservancy facility for drought control and drainage. During the rainy season, the electrical pumping station 10 can remove water in a low-lying area with a water pump to prevent the occurrence of waterlogging.

During the dry season, the electrical pumping station 10 can divert water for irrigation and the like by means of the water pump. The electrical pumping station 10 can timely drain accumulated water generated by overtopping waves during storm surge, and can improve the stability of the seawall.

The slope ratio of the slope in this embodiment is 1:3, the width of the hard pavement 8 is 6 m, the cross-sectional shape of the first prefabricated frame 1 is an equilateral triangle, and the edge length is 12 m. The slope ratio is the ratio of the vertical height to the horizontal width of the slope surface. The hard pavement 8 has a sufficient width to be used as a two-way lane or a sidewalk. The seawall in this embodiment achieves better ecological features and stability by means of a physical model, a mathematical model and structural calculation, and has strong wave-dissipating capability.

In order to improve the landscape function of the seawall, a landscape plank road 13 is disposed between two adjacent first prefabricated frames 1, a layout direction of the landscape plank road 13 is the same as the array direction of the first prefabricated frame 1, and the second prefabricated frame 2 and the wave break forest 3 are disposed in a space defined by the landscape plank road 13 and the first prefabricated frame 1. The landscape plank road 13 in this embodiment is disposed between the tips of the first prefabricated frames 1, with the tips of the first prefabricated frame 1 as a support. The landscape plank road 13 is made of corrosion-resistant wood. Preferably, the landscape plank road 13 in this embodiment is red pine, and has a Chinese style.

The embodiments of the disclosure are described in detail above with reference to the accompanying drawings, but the disclosure is not limited to the above-described embodiments, and various changes can be made without departing from the principle of the disclosure within the scope of the knowledge of those of ordinary skill in the art.

The invention claimed is:

1. A triangular modular ecological seawall, comprising:
   a plurality of first prefabricated frames arranged in an array,
   a second prefabricated frame and a wave break forest which are disposed between two adjacent first prefabricated frames and fill gaps between the first prefabricated frames,
   wherein the first prefabricated frame and the second prefabricated frame are tubular and each have a triangular cross-section shape, and inner cavities of the first prefabricated frame and the second prefabricated frame are respectively filled with first sea sand;
   the second prefabricated frame is smaller than the first prefabricated frame, one edge of each of the first prefabricated frames is collinearly disposed, and two edges of each of the second prefabricated frames are attached to two adjacent first prefabricated frames respectively.

2. The triangular modular ecological seawall according to claim 1, wherein the cross-sectional shape of each of the first prefabricated frame and the second prefabricated frame is an equilateral triangle.

3. The triangular modular ecological seawall according to claim 2, wherein the first prefabricated frame and the second prefabricated frame are each provided with a soil layer covering the first sea sand, and the soil layer is provided with first vegetation.

4. The triangular modular ecological seawall according to claim 3, further comprising:
   a slope formed by filling second sea sand at one side of the first prefabricated frame, the slope being higher at one side adjacent to the first prefabricated frame than the other side, and having a top surface provided with a hard pavement and a slope surface covered with second vegetation.

5. The triangular modular ecological seawall according to claim 4, wherein the wave break forest is *mangrove* or *Casuarina*, the hard pavement is a clay-bound macadam pavement, the first vegetation is saline-alkaline tolerant shrubs, and the second vegetation is turf.

6. The triangular modular ecological seawall according to claim 4, further comprising:
   a plurality of electrical pumping stations arranged on the first prefabricated frame,
   a first drainage ditch passing through the slope,
   a second drainage ditch arranged in an array direction of the first prefabricated frame at a lowest position of the slope, one end of the first drainage ditch being connected to the electrical pumping station, and the other end of the first drainage ditch being connected to the second drainage ditch.

7. The triangular modular ecological seawall according to claim 6, wherein the slope has a slope ratio of 1:3, the hard pavement has a width of 6 m, the cross-sectional shape of the first prefabricated frame is an equilateral triangle with an edge length of 12 m.

8. The triangular modular ecological seawall according to claim 7, wherein the soil layer has a thickness of 0.5 m.

9. The triangular modular ecological seawall according to claim 6, further comprising:
   a landscape plank road between two adjacent first prefabricated frames arranged in a same direction as the array direction of the first prefabricated frame, and the second prefabricated frame and the wave break forest being disposed in a space defined by the landscape plank road and the first prefabricated frame.

10. The triangular modular ecological seawall according to claim 9, wherein the landscape plank road is made of corrosion-resistant wood.

\* \* \* \* \*